May 31, 1927.   
G. W. GRASER  
1,630,486
LINK COUPLER
Filed May 5, 1923
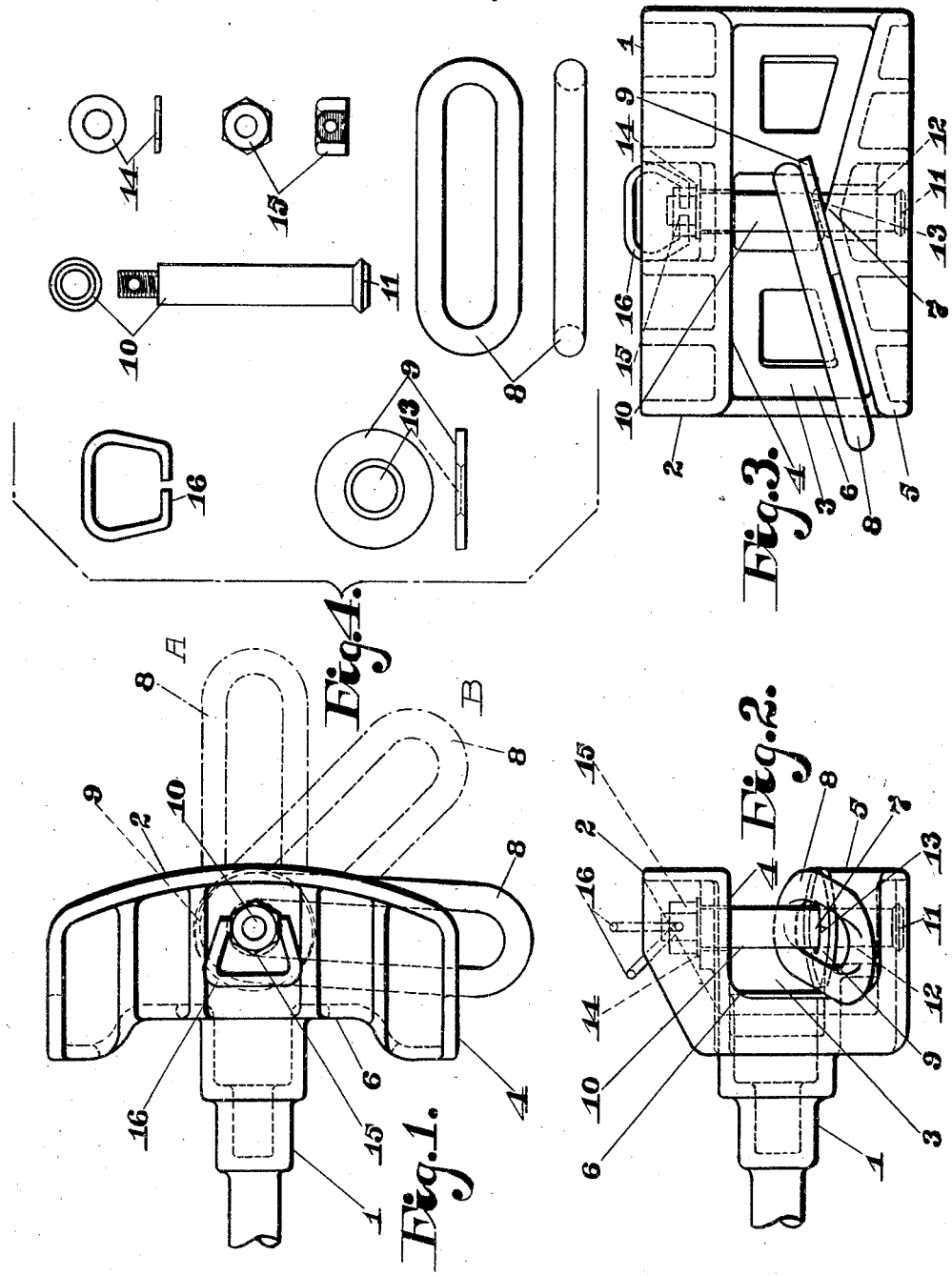
WITNESS  
INVENTOR  
George W. Graser, Patented May 31, 1927.

1,630,486

UNITED STATES PATENT OFFICE.

GEORGE W. GRASER, OF BEAVER FALLS, PENNSYLVANIA, ASSIGNOR TO KOPPEL INDUSTRIAL CAR AND EQUIPMENT COMPANY, OF PITTSBURGH, PENNSYLVANIA, A CORPORATION OF PENNSYLVANIA.

LINK COUPLER.

Application filed May 5, 1923. Serial No. 636,897.

This invention relates to car couplings and more particularly to coupling of the link and pin type and has for an object the provision of means whereby the projecting end portion of the link of such a coupling is automatically moved away from the longitudinal center line of the coupling toward one side or the other of its coupler when a car equipped with this coupling is uncoupled from another car, thus preventing the link from becoming damaged when the outside faces of the couplers of the uncoupled cars come together.

Another object of the invention is to provide a coupling of the link and pin type in which the coupling pin cannot be accidentally separated from the coupler and coupling link.

These and other objects will be apparent from the following description:

Referring to the drawings in which like reference characters refer to like parts, Fig. 1 is a plan view of a coupling, embodying the invention; Fig. 2 is a side elevational view of the same; Fig. 3 is an end elevational view of the same, and Fig. 4 is a group of views illustrating the coupling link and pin in detail.

Referring now in detail to the drawing, the reference character 1 indicates the coupler, which may be attached to the car body (not shown) in the usual manner. The outer end portion of this coupler is provided with a recess 3 having a horizontal top portion 4 and bottom portion 5 and a vertical back portion 6. The bottom portion 5 is highest at the longitudinal center line of the coupler and slopes downwardly and outwardly from each side of such center line toward the sides of the coupler. Within the recess 3 a coupling link 8 and washer 9 are provided, each of which is loosely mounted on a coupling pin 10 which passes through the top and bottom portions 4 and 5 respectively of the coupler and through the link 8 and washer 9, which are preferably formed separately. The lower end portion of the pin 10 is provided with an enlargement 11 which is of less diameter than the diameter of the opening 12 in the bottom portion 5 of the coupler through which the pin passes and of greater diameter than the opening 13 formed in the washer 9 through which the pin also passes. The upper portion of the pin 10 extends through an opening formed in the upper portion 4 of the coupler and is held in its proper operative position by a washer 14 which is secured to the pin by a nut 15, such washer engaging the outer surface of the top portion 4 thus preventing the pin from dropping out of the coupler. For the purpose of raising and lowering the pin 10 a loop or handle member 16 is provided the ends of which pass through the nut and engage the pin 10 thus locking the nut against accidental rotation relative to the pin.

When the link 8 and washer 9 are mounted on the pin 10 the lower surface of the washer rests on the bottom portion 5 of the coupler while the lower surface of the link rests upon the upper surface of the washer. It will be noted when this link is coupled to a coupler of an adjacent car it is in the position as indicated by the reference character "A" and when in this position the washer 9 will rest on the top of the highest portion 7. When the coupling is uncoupled the link due to its weight will cause the washer to tilt to one side or the other of the highest portion 7 thus causing the outer portion of the link to move to a position away from the longitudinal center line of the coupler as indicated by the reference character B or to a similar position at the opposite side of the center line. The edge of the metal forming the opening in the washer is beveled from the top and bottom so that the washer will be permitted to tilt from one side to the other without binding on the pin.

It will here be noted that when the link is in the position as indicated by B that should it receive a blow from an oncoming car it will be forced inwardly to a position as shown in full lines in the drawings and will not become distorted or damaged by being bent over the front face of the coupler as has heretofore been the case.

When a car equipped with this coupling is to be coupled with another car and it is desired to use the link of such other car, the pin 10, by the use of the handle 15 is raised out of the opening in the bottom 5 of the coupler a sufficient distance to permit the coupling link of the other car to pass under the enlarged portion 11 of the pin and when the link is in its proper position the pin is passed through the link and into the opening in the bottom portion 5 of the coupler thus coupling the cars together. It will here be noted that as the pin 10 is raised the enlarged portion 11 thereof will engage the washer 9 and will raise the inner end portion of the link 8, accidental separation of these parts being prevented by the opening in the washer being made of less diameter than the enlarged portion 11 of the pin 10.

Many minor changes may be made in the details of the invention without departing from the spirit and scope of the appended claims.

Having thus described the invention, what I claim as new and desire to secure by Letters Patent is:—

1. In a car coupling, a coupler having a recess formed therein, an elevated portion in said recess, a link loosely mounted in said recess, a washer between said link and coupler adapted to rest on said elevated portion when the link is in operative position and adapted to permit the link to tilt by gravity toward one side or the other of said coupler.

2. In a car coupling, a coupler having a recess formed therein, a link and washer loosely mounted therein, a pin passing through said coupler, link and washer, the lower wall of said recess being highest at the longitudinal center line of the coupler and sloping therefrom toward the sides of the coupler, said washer being adapted to engage said highest portion of said lower wall.

3. In a car coupling, a coupler, a link loosely mounted in said coupler, a washer beneath said link, the lower portion of said coupler being highest at its central portion and tapering therefrom toward the sides of the coupler, said washer being adapted to engage said highest portion when said link is in coupled position and adapted to tilt toward one side or the other of the coupler when the link is uncoupled whereby said link is caused to move by gravity toward one side or the other of the coupler.

4. In a car coupling, a coupler, a recess in said coupler, a ridge formed on the lower wall of said recess, a washer loosely mounted in said recess, a link mounted in said recess and contacting with said washer, said washer engaging said ridge when the link is in coupled position, and adapted to be tilted by said link, whereby said link is caused to move by gravity to the side of said coupler.

In testimony whereof I affix my signature.

GEORGE W. GRASER.